United States Patent
Goldberg et al.

(10) Patent No.: US 10,222,799 B2
(45) Date of Patent: *Mar. 5, 2019

(54) AUTONOMOUS VEHICLE PICKUP DIRECTED BY SOCIALLY DERIVED META DATA IN PUBLIC ENVIRONMENTS

(71) Applicant: INTERNATIONAL BUSINESS MACHINES CORPORATION, Armonk, NY (US)

(72) Inventors: Itzhack Goldberg, Hadera (IL); Harry R. McGregor, Tucson, AZ (US); Christopher B. Moore, Vail, AZ (US); Jose R. Mosqueda Mejia, Michoacan (MX)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/458,409

(22) Filed: Mar. 14, 2017

(65) Prior Publication Data

US 2018/0267536 A1 Sep. 20, 2018

(51) Int. Cl.
*G05D 1/00* (2006.01)
*G05D 1/02* (2006.01)
(Continued)

(52) U.S. Cl.
CPC ......... *G05D 1/0088* (2013.01); *G05D 1/0212* (2013.01); *G06Q 50/30* (2013.01); *G08G 1/202* (2013.01)

(58) Field of Classification Search
CPC .... G05D 1/0088; G05D 1/0212; G06Q 50/30; G06Q 20/12; G08G 1/202
See application file for complete search history.

(56) References Cited

U.S. PATENT DOCUMENTS 9,421,972 B2   8/2016   Davidsson et al.
9,552,564 B1 *   1/2017   Martenis .............. G06Q 10/083
(Continued)

FOREIGN PATENT DOCUMENTS

DE   102014224108 A1   6/2016
JP   2000028699 A   1/2000

OTHER PUBLICATIONS

IBM: List of IBM Patents or Patent Applications Treated as Related (Appendix 9), Oct. 12, 2017, 2 pages.
(Continued)

*Primary Examiner* — Genna M Mott
(74) *Attorney, Agent, or Firm* — Kristofer L. Haggerty

(57) ABSTRACT

Embodiments of the present invention disclose a method, computer program product, and system for directing movements of an autonomous vehicle. A vehicle operator exiting a vehicle is detected. A plurality of metadata is received wherein the plurality of metadata includes at least location data of a user and a timestamp. A pickup time and pickup location is identified based on received metadata. A route to the pickup location is generated based on at least a default location of the autonomous vehicle. The autonomous vehicle is directed to travel to the identified location such that the autonomous vehicle is arriving at the identified pickup time. Updates to the pickup location and pickup time are determined by dynamically monitoring received metadata. A modified route is generated, in response determining updates in one or more of the pickup location and pickup time and the autonomous vehicle is redirected to the updated pickup location.

14 Claims, 4 Drawing Sheets

(51) Int. Cl.
*G08G 1/00* (2006.01)
*G06Q 50/30* (2012.01)

(56) References Cited

U.S. PATENT DOCUMENTS

| | | |
|---|---|---|
| 9,646,356 B1 | 5/2017 | Schwie et al. |
| 2015/0339928 A1* | 11/2015 | Ramanujam ........... G08G 1/202 |
| | | 701/23 |
| 2016/0116293 A1 | 4/2016 | Grover et al. |
| 2016/0187139 A1* | 6/2016 | Agulnik ................. G01C 21/00 |
| | | 701/409 |
| 2016/0240080 A1 | 8/2016 | Nordbruch |
| 2016/0273922 A1 | 9/2016 | Stefan |
| 2017/0126837 A1 | 5/2017 | Wang et al. |

OTHER PUBLICATIONS

Pending U.S. Appl. No. 15/697,542, filed Sep. 7, 2017, entitled: "Autonomous Vehicle Pickup Directed by Socially Derived Meta Data in Public Environments", 31 pages.

\* cited by examiner

AUTONOMOUS VEHICLE PICKUP DIRECTED BY SOCIALLY DERIVED META DATA IN PUBLIC ENVIRONMENTS

BACKGROUND

The present invention relates generally to the field of automobiles, and more particularly to autonomous vehicle driving using location data and social media.

Parking structures are a common necessity for all areas expecting mass visitation, especially within an urban environment. Improvements in the field of vehicle automation may increase efficiency of shoppers, sports fans, or any user of a parking structure. Parking structures may implement a form of automatic delivery of vehicles through Valet Parking, but the cost and time associated with Valet Parking may be undesirable in an ever increasingly fast-paced world.

Embodiments of the present invention recognize that vehicle operators must return to the same parking structure/environment to retrieve their vehicle. Parking location within the structure is not under the control of the vehicle operator as arrival time and availability, may be cause time and money to be expended in a suboptimal parking location. It may be advantageous to utilize autonomous vehicles and the metadata from social media of a user to predict where and when a vehicle should meet its operator to depart a given location.

SUMMARY

Embodiments of the present invention disclose a method, computer program product, and system for directing movements of an autonomous vehicle. A vehicle operator exiting a vehicle is detected. A plurality of metadata is received wherein the plurality of metadata includes at least location data of a user and a timestamp. A pickup time and pickup location is identified based on received metadata. A route to the pickup location is generated based on at least a default location of the autonomous vehicle. The autonomous vehicle is directed to travel to the identified location such that the autonomous vehicle is arriving at the identified pickup time. Updates to the pickup location and pickup time are determined by dynamically monitoring received metadata. A modified route is generated, the modified route includes one or more of an updated pickup location and updated pickup time, in response determining updates in one or more of the pickup location and pickup time and the autonomous vehicle is redirected to the updated pickup location based on the modified route.

DETAILED DESCRIPTION

Figure 1:
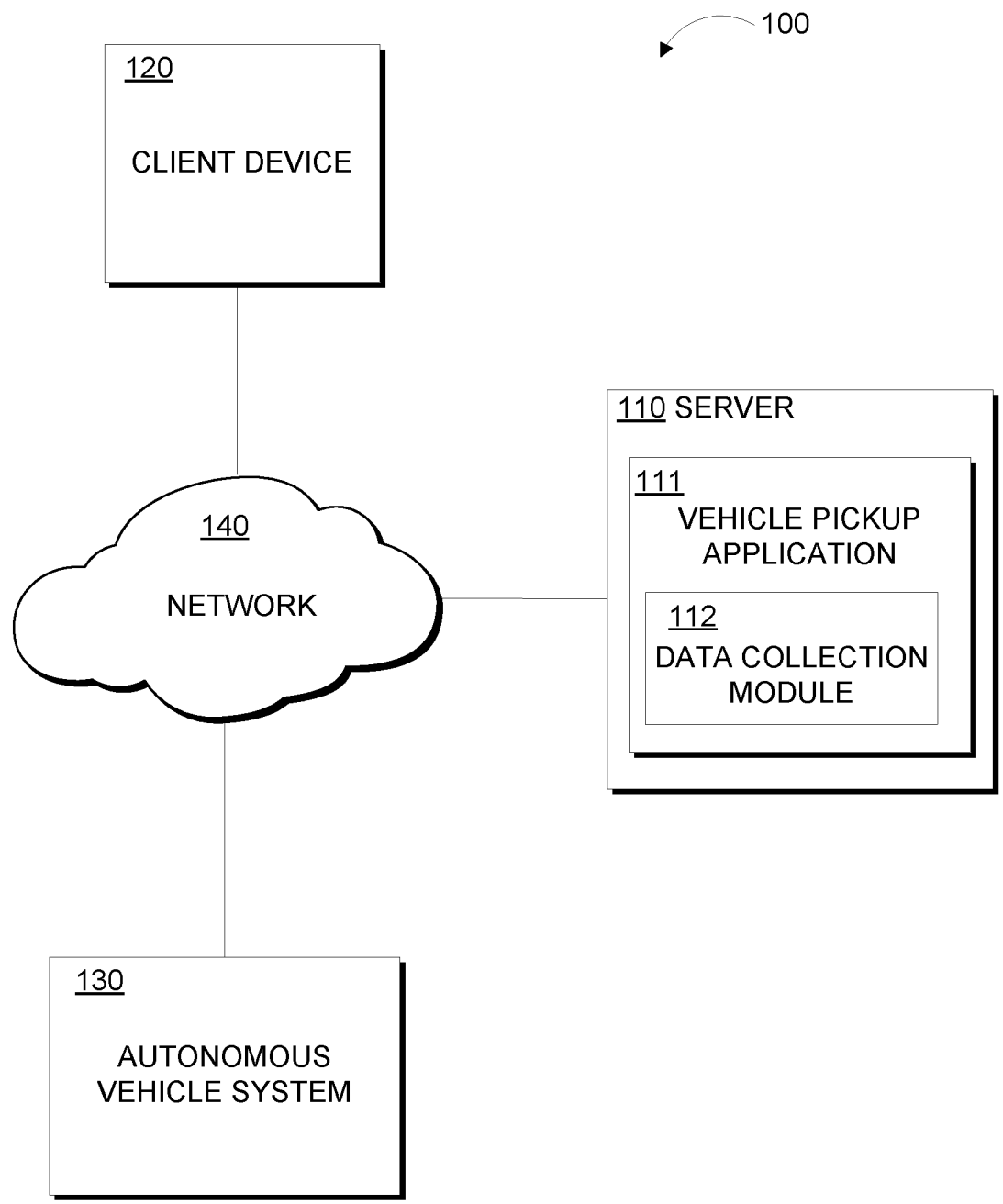
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As autonomous vehicles become more prevalent it may be advantageous to enable autonomous vehicles to pick up and drop off the vehicle operator autonomously while leveraging social media to accurately determine pickup locations. In various embodiments, social media metadata in conjunction with a Global Positioning System (GPS) may be utilized to track and predict when and where a vehicle operator may want or need an autonomous vehicle. The autonomous vehicle may be directed to, for example, the nearest road accessible location, available parking place, or event pick/drop off zone.

In various embodiments of the present invention, a method, computer program product, and a computer system is provided for directing movements of an autonomous vehicle. The movements of an autonomous vehicle may be directed by detecting a vehicle operator exiting the autonomous vehicle. Metadata may be received from the vehicle operator via a device. The metadata may include location data of vehicle operator and time information for accurate location detection. A pickup time and pickup location may be identified based on the received metadata in order to generate a route for the autonomous vehicle from the autonomous vehicle's current location, or default location, to the vehicle operator for pickup. The autonomous vehicle may be directed to the pickup location such that the autonomous vehicle arrives at the identified pickup time.

In various embodiments, the received metadata may update, or change, over time and a new route may be generated based on updated metadata. The autonomous vehicle may be redirected one or more times based on changes detected by the dynamic monitoring of the received metadata. In various embodiments, metadata may be location data based on a GPS, call logs, pictorial data, video data, and audio data. Metadata may also include social media metadata associated with the vehicle operator. The vehicle operator may communicate social media login information to allow for datamining. Datamining may extract relevant data associated with locations or travel plans the vehicle operator is currently engaged in, will be going, or has visited in the past, for example, names, business names, hashtags, hyperlinks, user tags, and the like.

In various embodiments, data is communicated to a second autonomous vehicle. A route time value for the autonomous vehicle and the second autonomous vehicle is determined. The smallest route time value is identified and one of the first or second autonomous vehicles associated with the smallest route time value is directed to the user.

The present invention will now be described in detail with reference to the Figures. FIG. 1 is a functional block diagram illustrating a distributed data processing environment for directing an autonomous vehicle to a vehicle operator, generally designated 100, in accordance with one embodiment of the present invention.

Distributed data processing environment 100 includes server 110, client 120, and autonomous vehicle system 130, all interconnected over network 140. Server 110, client device 120, and autonomous vehicle system 130 may be a laptop computer, tablet computer, netbook computer, personal computer (PC), a desktop computer, a smart phone, or any programmable electronic device capable of communicating, for example, with client device 120, via network 140 and with various components and devices within the distributed data processing environment 100.

Server 110 includes vehicle pickup application 111. Vehicle pickup application 111 operates generally to receive metadata from various sources. For example, vehicle pickup application 111 may receive social media metadata, GPS location data, time stamps, or user preferences, from client device 120 via server 110. Vehicle pickup application 111 may additionally receive data from autonomous vehicle system 130 when a vehicle operator exits an autonomous vehicle, for example, via a door sensor. Vehicle pickup application 111 may analyze the metadata to determine what time and at what location the vehicle operator may need a pickup. Vehicle pickup application 111 also includes data collector module 112, described in further detail below. Vehicle pickup application 111 may communicate the determined time and location, in order to direct an autonomous vehicle to the vehicle operator's location. For example, vehicle pickup application 111 may direct an autonomous vehicle to the determined location via autonomous vehicle system 130.

Autonomous vehicle system 130 may operate generally to receive environment data using a variety of techniques such as radar, Light Detection and Ranging (LIDAR), GPS, odometry, and visual data. Autonomous vehicle system 130 may interpret the received environmental data to identify appropriate navigation paths, as well as obstacles and relevant signage. Autonomous vehicle system 130 may receive direction from vehicle pickup application 111 via server 110 and use the received direction as the endpoint location, or vehicle operator location, and time which autonomous vehicle system 130 must navigate. The endpoint location may be, for example, the closest location to the vehicle operator reachable by road, a designated parking area, a parking spot, or vehicle waiting area. Embodiments of the present invention recognize that Bayesian Simultaneous localization and mapping (SLAM) algorithms, which fuse data from multiple sensors and an off-line map into current location estimates and map updates, may be used to identify appropriate navigation paths. Other algorithms may be used, for example, Real-Time Locating Systems (RTLS), or Detection and Tracking of Moving Objects (DATMO). Autonomous vehicle system 130 may communicate environmental data to vehicle pickup application 111.

Vehicle pickup application 111 includes data collection module 112. Data collection module 112 may operate generally to collect data and communicate the collected data to vehicle pickup application 111 in order for vehicle pickup application 111 to determine what time and at what location the vehicle operator may need a pickup. In various embodiments, the time and location of pickup may be predetermined by a user input received from client device 120 via server 110. For example, a vehicle operator may input time and destination information in vehicle pickup application 111 manually, or the estimated time when they will leave and what location will be optimal for the vehicle operator to meet the vehicle. In various embodiments, data collection module 112 may utilize data stored in a user profile associated with the vehicle operator.

Data stored in a user profile may be analyzed such that pickup locations may be predicted or anticipated based on a pickup location history or frequent pickup locations. The user profile data may enable vehicle pickup application 111 to determine a pickup location and pickup time of the vehicle operator without the need for manual input from the vehicle operator.

In various embodiments, data collection module 112 may collect, for example, calendar entries from calendars or agendas associated with the vehicle operator; social media events that involve appointments, tickets purchased for events and other traceable data associated with social media events; reservations and reservation system entries or any other place with a reservation system which can be accessed to harvest data; or digital shopping lists or "clipped" digital coupons for stores located at a destination. It should be appreciated that the above list is not exhaustive and data collection module 112 may collect other data associated with a vehicle operator, for example, location data and time-at-location data. Digital signatures, which can indicate a user location and planned activities including social media interaction with other people or external requests for participation from influential people, may be collected by data collection module 112.

In various embodiments, data collection module 112 may receive data by datamining social media websites or websites associated with a vehicle operator's location. For example, a vehicle operator may for a movie and movie theater in a social media post. Data collection module 112 may utilize datamining to analyze the social media post and linked website for operating hours of the theater, location of the theater, and the duration of the movie. Data collection module 112 may also extract data associated with attractions with proximity to the GPS location of the vehicle operator. In various embodiments, it may be advantageous for data collection module 112 to use datamining to determine a more accurate physical location of the vehicle operator while at the attraction or event. Data collection module 112 may additional receive data from client device 120 via network 140.

Client device 120 may operate generally to communicate social media data, GPS location data, time stamps, user profile requests, login requests, along with various other metadata or queries to vehicle pickup application 111 via network 140. Client device 120 may be capable of displaying autonomous vehicle location data and communicating user input, for example, a request or query from the vehicle operator.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server 110 and client device 120.

Figure 2:
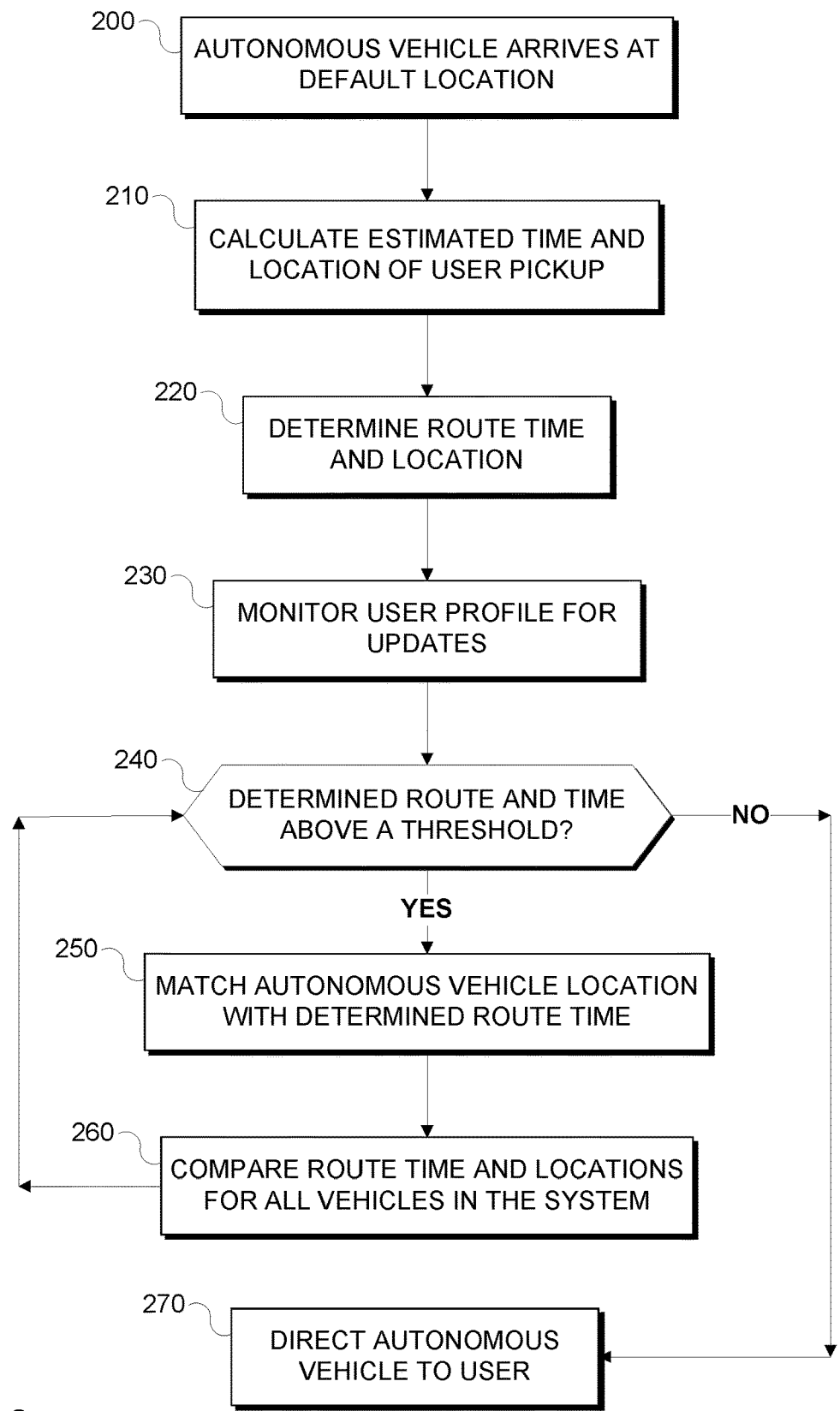
FIG. 2 is a flowchart depicting operational steps of a vehicle pickup application, on a server computer within the data processing environment of FIG. 1, in accordance with an embodiment of the present invention.

FIG. 2 is a flowchart depicting operational steps of vehicle pickup application 111, directing an autonomous vehicle of the vehicles of autonomous vehicle system 130, to a vehicle operator, within the distributed data processing environment 100 of FIG. 1, in accordance with an embodiment of the present invention.

A vehicle operator may exit an autonomous vehicle. In various embodiments, autonomous vehicle system 130 may detect that the vehicle operator has exited via door sensors, weight sensors, proximity sensors, or cameras. Autonomous vehicle system 130 may set a default location for the autonomous vehicle once the vehicle operator exits the autonomous vehicle. The default location may be, for example, an assigned parking spot, the driveway of a user, a parking lot, a concert hall, a waiting area near the user. Alternatively, the default location determined by social media data collection as described below in relation to a multiple vehicle system. Autonomous vehicle system 130 may communicate to vehicle pickup application 111 that the autonomous vehicle has reached the default location. In various embodiments, the default location may be set by the vehicle operator driving to a location and setting that location as the default location via client device 120, or merely entering the defaulting location using the application.

Vehicle pickup application 111 receives data from autonomous vehicle system 130 that the autonomous vehicle has arrived at a default location, in step 200. In various embodiments, the default location may be predetermined remotely, for example, via user input via client device 120, and autonomous vehicle system 130 may relocate to the predetermined location autonomously or by a vehicle operator.

Vehicle pickup application 111 calculates the pickup time and pickup location, in step 210. In various embodiments, the pickup time and location may be calculated based on social media and/or GPS data collection as described above in relation to data collector module 112. Vehicle pickup application 111 calculates, based on the location and length of the concert, the time and location the user will need to be picked up by the autonomous vehicle. This calculated pickup location and time is based on the available data collected by data collector module 112. In various embodiments, data collector module 112 may receive social media metadata from client device 120 via server 110 associated with a future event to be attended by the vehicle operator. The future event may indicate the potential location of the vehicle operator at a future time. For example, a hashtag or social media post indicating the vehicle operator is attending a concert the next day may be received by vehicle pickup application 111. Vehicle pickup application 111 may calculate a potential need for an autonomous vehicle at the future time and direct an autonomous vehicle to a default location within a geographical threshold of the future event to anticipate the potential need.

For example, geographical locations may be determined to be a pending location when the geographical locations associated with a count of social media posts above a threshold. For example, vehicle pickup application 111 may receive social media metadata where a count of hashtags "#ABCConcertHall" exceed a predetermined threshold. Vehicle pickup application 111 may communicate "ABC Concert Hall" to vehicle operator as a potential/proposed pickup location, where the proposed pickup occurs at a future time.

In various embodiments, data collector module 112 may periodically communicate changes in metadata to vehicle pickup application 111. Vehicle pickup application 111 may determine a new time and location to pick up the vehicle operator based on the changes in received metadata. In various embodiments, the user may provide a predetermined pickup time and pickup location to the autonomous vehicle via autonomous vehicle system 130. These requests may be based on a schedule associated with a user profile or user input via client device 120.

Vehicle pickup application 111 compares the calculated values for the pickup time and pickup location of vehicle operator and determines the optimal route, time of departure and intermediate temporary parking locations for the vehicle, in step 220. The optimal route may be calculated such that the autonomous vehicle may reach the pickup location at the pickup time taking into account the travel time needed.

Various factors may determine travel time, for example, weather, traffic, construction, pedestrian interference due to an event, or other factors that vehicle pickup application 111 receives via social media metadata collected by data collector module 112 or received from user input via client device 120. In various embodiments, the autonomous vehicle is traveling to the vehicle operator at the pickup location and vehicle pickup application 111 may receive social media metadata indicating a delay event, for example, a parade. For example, the vehicle operator may in restaurant by a window and post on social media using hashtags indicating parade floats. Vehicle pickup application 111 may determine a parade is occurring near the vehicle operator and an alternative route may be required adding travel time to the optimal route. In various embodiments, vehicle pickup application 111 may communicate a delay to the vehicle operator. Vehicle pickup application 111 may direct an alternative autonomous vehicle to the vehicle operator to mitigate delays, as described below in relation to an autonomous vehicle system with multiple vehicles.

Vehicle pickup application 111 monitors changes in the metadata associated with the vehicle operator, in step 230. For example, a change in a daily agenda, social media posts or hashtag that indicate a delay or cancellation. In various embodiments, the vehicle operator may manually request adjustments to the optimal route or time of departure. In various embodiments, the monitoring of social media associated with the vehicle operator may occur periodically, for example, every 20 minutes or at any predetermined time. The monitoring may also take place at a time estimated by vehicle pickup application 111 based on the received social media metadata. For example, vehicle pickup application 111 may increase the frequency of monitoring changes in social media metadata changes 10 minutes before a movie attended by the vehicle operator ends. In various embodiments, some data may be "pushed" to vehicle pickup application 111 automatically by social media websites associated with vehicle operated social media login information.

In various embodiments, multiple autonomous vehicles may be utilized in a system, for example, autonomous vehicle system 130. A multiple vehicle system may be advantageous reduce delays of vehicle departure and to optimize best route for rendezvous with the vehicle operator. Data from the autonomous vehicles in the system may be compared to determine if any obstacles, for example, traffic jams or accidents, may result in one vehicle being overly delayed. In various embodiments, if a delay is determined, an alternative vehicle may be directed to the vehicle operator. In various embodiments, multiple vehicles may converge on a temporary parking locations close to the expected vehicle operator pickup location can be leveraged for larger events, such as movie showings or concerts, where multiple pickups may be needed. In various embodiments, if social media posts associated with a particular location exceed a threshold, vehicle pickup application 111 may set that location as a default location and direct one or more autonomous vehicles to the default location in anticipation of multiple needed pickups.

Vehicle pickup application 111 determines the calculated pickup time for a calculated pickup location is outside a threshold, in decision step 240 "YES" branch. Vehicle pickup application 111 may communicate with other autonomous vehicles connected to the system in order to determine if another autonomous vehicle can reach the pickup location at the pickup time given the determined travel time for the first autonomous vehicle will not allow the first autonomous vehicle to reach the pickup location within a threshold of the pickup time. In various embodiments, the threshold may be predetermined by the vehicle operator. For example, the vehicle operator may indicate that there is a desire not to wait longer than 10 minutes for a pickup. In various embodiments, the threshold may be determined by social media metadata, for example, social media posts indicating frustration or dissatisfaction with the autonomous vehicle or the experienced wait time. For example, if the vehicle operator posts "#late" on social media, vehicle pickup application 111 may determine the current autonomous vehicle's route time is outside a threshold and a new autonomous vehicle is needed.

Vehicle pickup application 111 determines the autonomous vehicle with a travel time that would reach the pickup location closest to the pickup time, in step 250, and matches the autonomous vehicle with the best travel time to the vehicle operator waiting for a pickup. While the matched autonomous vehicle is traveling to the pickup location, vehicle pickup application 111 periodically compares the route times and locations of other vehicles in the system, in step 260, to determine if there is a vehicle with an even better match. This may be advantageous in order to ensure proper flow between one or more cars, for example, when exiting a large event to go to another large event where there are multiple delays at multiple locations.

If vehicle pickup application 111 determines an optimal route and travel time is at or below a threshold, in decision step 240 "NO" branch, vehicle pickup application 111 directs the autonomous vehicle to the pickup location at the pickup time, in step 270. In various embodiments, after the autonomous vehicle picks up the vehicle operator, social media metadata associated with the vehicle operator continues to be monitored by vehicle pickup application 111. The continued monitoring may determine a satisfaction level associated with the user profile associated with the vehicle operator and an experience rating the vehicle operator had with autonomous vehicle system 130.

In various embodiments, vehicle pickup application 111 may be an application on a mobile device that requires a user profile and login authentication associated with the vehicle operator. Vehicle pickup application 111 may receive the login data from client device 120, for example, as a query through a web browser. The vehicle operator may provide some data in order to login, for example, social network login information, names, calendar information, agenda information, cloud calendar applications, and the like.

Figure 3:
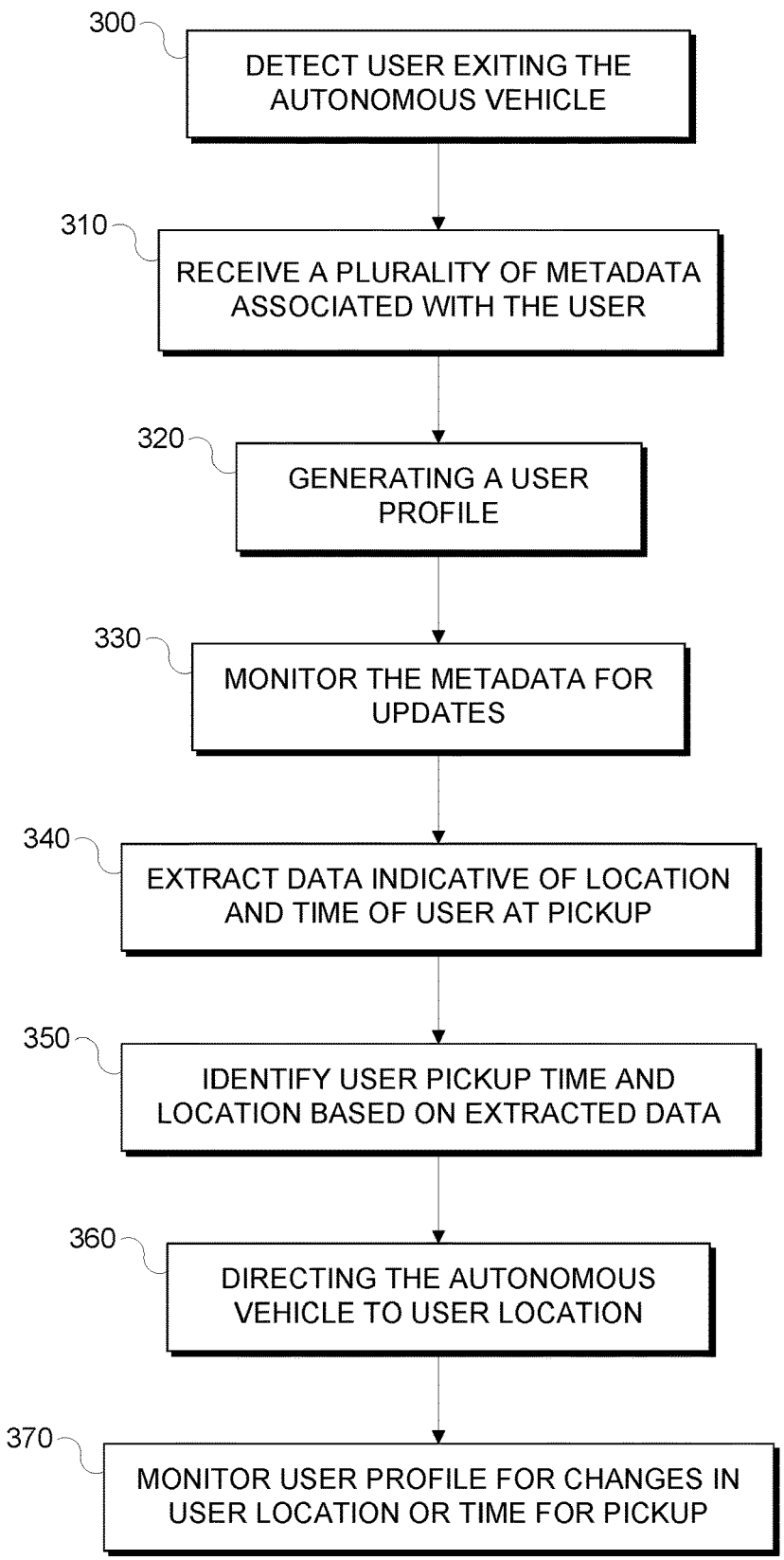
FIG. 3 is a flowchart depicting operational steps of an alternative embodiment of vehicle pickup application, on a server computer within the data processing environment of FIG. 1, in accordance with an embodiment of the present invention.

FIG. 3 is a flowchart depicting an alternative embodiment which autonomous vehicle is directed to a vehicle operator for pick up, in accordance with an embodiment of the present invention.

Vehicle pickup application 111 detects a vehicle operator exiting an autonomous vehicle, in step 300. In various embodiments, vehicle pickup application 111 receives data that the operator has left the vehicle from client device 120 via a mobile app, GPS, dongle proximity, or any other detection method for exiting a vehicle. In various embodiments, vehicle pickup application 111 receives exit data from autonomous vehicle system 130.

Vehicle pickup application 111 receives a plurality of metadata associated with the vehicle operator, in step 310. In various embodiments, the metadata includes at least location data and a time stamp. In various embodiments, metadata may include timestamp data, location data associated with a Global Positioning System (GPS), user profile history, call logs, pictorial data, visual data, or audio data associated with a user profile that includes stored metadata associated with the vehicle operator.

Vehicle pickup application 111 generates a user profile associated with the vehicle operator based on the received metadata, in step 320. In various embodiments, vehicle pickup application 111 generates a user profile in response to receiving a subscription request from the vehicle operator via a device, for example, client device 120. The subscription request may include identification information associated with the vehicle operator, for example, a name, or ID and password. The received metadata associated with the vehicle operator may be stored in the generated user profile. Location data associated with the user profile is identified and a set of suggested locations for display may be communicated to a user device, based on the user profile. In various embodiments, location data may be received by vehicle pickup application 111 from a user device, for example, client device 120. Location data may include data based on a Global Positioning System (GPS) or pictorial data indicating a location, for example, a picture of a park sign or storefront from which a location can be determined. In various embodiments, audio signals may be used to determine a vehicle operator's location using acoustic location determination or other methods known in the art.

Vehicle pickup application 111 monitors for changes in the received metadata, in step 330. In various embodiments, vehicle pickup application 111 may query client device 120 or autonomous vehicle system 130 for changes in the metadata associated with the vehicle operator or user profile. The monitoring may be periodic, for example, every minute, 5 minutes, or 20 minutes or at any predetermined time determined by the vehicle operator. Alternatively, the application may dynamically adjust the monitoring period based on the time of day or the detected social activity of the vehicle operator.

Vehicle pickup application 111 extracts extracting data of location based on at least the location data and timestamp, in step 340. In step 350, vehicle pickup application 111 in response to identifying a time and location for pickup based on extraction data, a pickup location coordinate values and pickup time value is generated. In various embodiments, identified time and locations may be communicated to one or more autonomous vehicles in order to determine if there is an autonomous vehicle in a more advantageous position, for example, a no traffic area or closer proximity to vehicle operator. Using multiple cars may be advantageous as communicating user profile data to a second or third autonomous vehicle allow the determination of multiple route time values. The smallest route time value is identified and the autonomous associated with the smallest route time value is directed to the vehicle operator's location, in step 360.

Vehicle pickup application 111 monitors the user profile and, in response to updates to the user profile, modifies the travel location and pickup time value, in step 370. In various embodiments vehicle pickup application 111 may monitor the GPS location data of a vehicle operator, for example, through a shopping trip. The vehicle operator may enter the mall on the west side but move throughout the whole mall and wish to exit on the opposing east wall of the mall. Vehicle pickup application 111 may monitor the movement through the mall and direct the autonomous vehicle to travel to the east wall of the mall when the use is approaching the last few shops by the east wall. This way the vehicle operator's location may be predicted which leads to shorter wait times for an autonomous vehicle.

In various embodiments of the present invention, vehicle pickup application 111 may be stored within an autonomous vehicle computer system on board an autonomous vehicle(s) connected within autonomous vehicle system 130. Autonomous vehicle system 130 may detect the exit of a vehicle operator, via, for example, a door sensor, seat sensor, RFID in a cell phone, dongle, or fob key. Autonomous vehicle system 130 may associate the exit signal with the vehicle operator and monitor social media and GPS location associated with the vehicle operator. Autonomous vehicle system 130 may receive a pickup request, or determine a pickup time and pickup location as described above, and communicate with other vehicles within autonomous vehicle system 130 to determine the best vehicle and route to pick up the vehicle operator.

In various embodiments, a user profile may be generated in response to vehicle pickup application 111 receiving a subscription request, wherein the subscription request includes an identification and password. Vehicle pickup application 111 may generate a user profile associated with the identification, the identification being associated with the vehicle operator. The identification may include access to social media accounts associated with the vehicle operator. Vehicle pickup application 111 may associate received metadata associated with the vehicle operator to the generated user profile. Vehicle pickup application 111 may collect and correlate social media posts associated with geographical locations and identify common or often visited locations based on the received metadata. Vehicle pickup application 111 may communicate a set of suggested travel locations for display on a user device associated with the vehicle operator, based on the user profile. In response to an input selection by the vehicle operator, vehicle pickup application 111 may direct an autonomous vehicle to the vehicle operator for pickup and travel to a location based on the input selection.

In various embodiments, it may be advantageous to optimize the parking and pickup of a vehicle operator from a parking structure by utilizing existing, social media derived, metadata sources and analytics to determine, update, and relocate an autonomous vehicle automatically or on demand by a vehicle operator with a specific time and location. For example, directing an autonomous vehicle to be at the nearest possible parking place to the vehicle operator at a predetermined time. In various embodiments, predictive time and location may be determined using data analysis across a broad range of inputs, for example, movie show times, restaurant closing times, expected occupancy time at entertainment venues, etc. to predict when the autonomous vehicle may be needed, and position it appropriately, up to and including a general autonomous valet service at a specific location or venue to minimize delays while waiting for a vehicle to be retrieved.

For example, if a vehicle will not be needed for a time interval above a threshold, the parking environment may be configured by having the vehicle autonomously position itself further away during that time, factoring in the increased drive time needed to bring the vehicle back where it will be need and predict when it will be needed. It may be advantageous to utilize autonomous vehicle parking in large shopping environments or busy entertainment districts, where you may enter the venue at one side, and want to meet your vehicle at another location.

In various embodiments of the present invention, the internal car environment may be adjusted prior to the autonomous vehicle reaching the pickup location. For example, the cooling, heating, seat position, and/or steering wheel position of the autonomous vehicle may be based on the vehicle operator's preferences or profile just prior to rendezvous with the autonomous vehicle. It may be advantageous to integrate the settings adjustments with the Global Positioning System (GPS) location and pickup time to allow for location data to assist in cat adjustments. For example, if the autonomous vehicle is facing east in the morning the autonomous vehicle system 130 may adjusts tinting in the windows before the autonomous vehicle reaches the pickup location.

Figure 4:
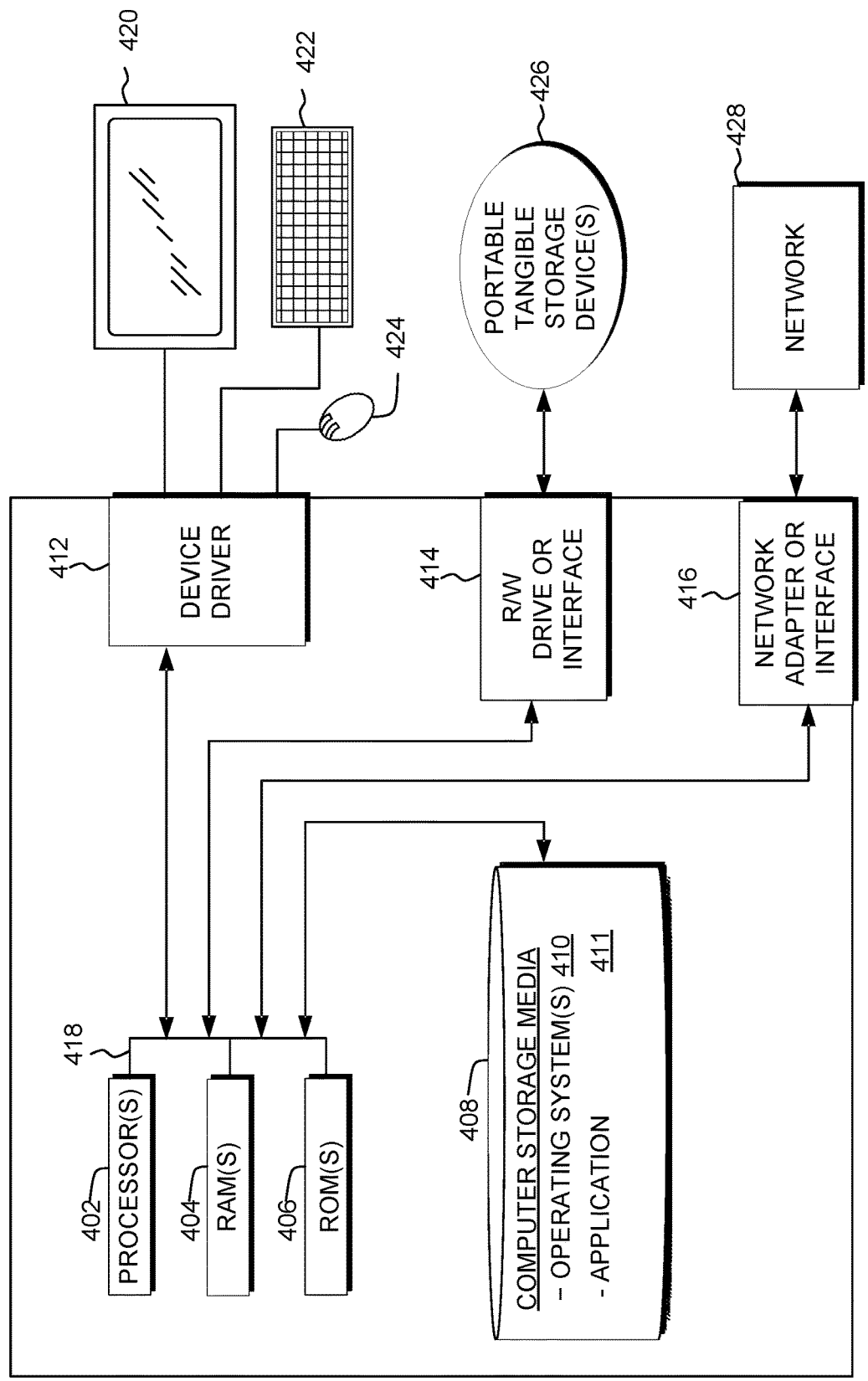
FIG. 4 depicts a block diagram of components of the server computer executing the ingestion application, in accordance with an embodiment of the present invention.

FIG. 4 depicts a block diagram of components of server 110 of distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, vehicle pickup application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include an R/W drive or interface 414 to read from and write to one or more portable computer readable storage media 426. Application programs 411 on server 110 may be stored on one or more of the portable computer readable storage media 426, read via the respective R/W drive or interface 414 and loaded into the respective computer readable storage media 408.

Server 110 may also include a network adapter or interface 416, such as a TCP/IP adapter card or wireless communication adapter (such as a 4G wireless communication adapter using Orthogonal Frequency-Division Multiple Access (OFDMA) technology) for connection to a network 428. Application programs 411 on server 110 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416, may comprise hardware and software (stored on computer readable storage media 408 and/or ROM 406).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for directing movements of autonomous vehicles, the method comprising:
    detecting a vehicle operator exiting a vehicle at a drop-off location;
    receiving metadata identifying at least a location of the vehicle operator, social media posts associated with the vehicle operator, and timestamps associated with the social media posts;
    identifying a pickup time and pickup location based on the received metadata;
    generating a route to the pickup location based on at least a default location of the autonomous vehicle;
    directing a first autonomous vehicle to travel to the identified location such that the first autonomous vehicle arrives at the identified pickup time;
    determining updates to the pickup location and pickup time by dynamically monitoring the received metadata;
    generating a modified route, the modified route includes one or more of an updated pickup location and updated pickup time, in response to determining updates to one or more of the pickup location and pickup time;
    redirecting the first autonomous vehicle to the updated pickup location based on the modified route;
    generating a user profile associated with the vehicle operator;
    associating the received social media data with the vehicle operator's user profile;
    continuously monitoring social media activity of the vehicle operator;
    determining proposed pickup locations based on the monitored social media posts, wherein the proposed pickup locations are geographical locations associated with a count of social media posts above a threshold; and
    communicating the proposed pickup locations to the vehicle operator device.

2. The method of claim 1, wherein metadata further comprises:
    timestamp data;
    location data based on a Global Positioning System (GPS);
    user profile history;
    call logs;
    pictorial data;
    video data; or
    audio data associated with the user profile.

3. The method of claim 1, further comprising:
    communicating the identified pickup time and identified pickup location to a second autonomous vehicle;
    generating a second route based on at least a second default location of the second autonomous vehicle;
    comparing the generated route of the first autonomous vehicle to the generated route of the second autonomous vehicle to determine which generated route has a shortest travel time; and
    directing one of the first or second autonomous vehicles with the shortest travel time, to the identified location.

4. The method of claim 1, further comprising:
    communicating for display on a vehicle operator device, one or more of:
        the identified pickup time;
        the identified pickup location; and
        data associated with the generated route.

5. The method of claim 1, wherein the default location includes one or more of:
    a social location based on social media posts exceeding a threshold, wherein the autonomous vehicle is directed to the social location;
    a parking location associated with the drop-off location, wherein the parking location is within a predetermined geographic range of the drop-off location;
    a vehicle operator location, wherein the vehicle operator location is determined based on user input; and
    a temporary location, wherein the temporary location is within a predetermined geographical range of the vehicle operator and the autonomous vehicle maintains a position for a duration not exceeding a predetermined time threshold.

6. A computer program product for directing movements by an autonomous vehicle, the computer program product comprising:
    one or more computer-readable non-transitory storage media and program instructions stored on the one or more computer-readable storage media, the program instructions comprising:
    instructions to detect a vehicle operator exiting a vehicle at a drop-off location;
    instructions to receive metadata identifying at least a location of the vehicle operator, social media posts associated with the vehicle operator, and timestamps associated with the social media posts;
    instructions to identify a pickup time and pickup location based on received metadata;
    instructions to generate a route to the pickup location based on at least a default location of the autonomous vehicle;
    instructions to direct a first autonomous vehicle to travel to the identified location such that the first autonomous vehicle arrives at the identified pickup time;
    instructions to determine updates to the pickup location and pickup time by dynamically monitoring received metadata;

instructions to generate a modified route, the modified route includes one or more of an updated pickup location and updated pickup time, in response to instructions to determine updates to one or more of the pickup location and pickup time;

instructions to redirect the first autonomous vehicle to the updated pickup location based on the modified route;

instructions to generate a user profile associated with the vehicle operator;

instructions to associate the received social media data with the vehicle operator's user profile;

instructions to continuously monitor social media activity of the vehicle operator;

instructions to determine proposed pickup locations based on the monitored social media posts, wherein the proposed pickup locations are geographical locations associated with a count of social media posts above a threshold; and instructions to communicate the proposed pickup locations to the vehicle operator device.

7. The computer program product of claim 6, wherein metadata further comprises:
   timestamp data;
   location data based on a Global Positioning System (GPS);
   user profile history;
   call logs;
   pictorial data;
   video data; or
   audio data associated with the user profile.

8. The computer program product of claim 6, further comprising:
   instructions to communicate the identified pickup time and identified pickup location to a second autonomous vehicle;
   instructions to generate a second route based on at least a second default location of the second autonomous vehicle;
   instructions to compare the generated route of the first autonomous vehicle to the generated route of the second autonomous vehicle to determine which generated route has a shortest travel time; and
   instructions to direct one of the first or second autonomous vehicles with the shortest travel time, to the identified location.

9. The computer program product of claim 6, further comprising:
   instructions to communicate for display on a vehicle operator device, one or more of:
   the identified pickup time;
   the identified pickup location; and
   data associated with the generated route.

10. The computer program product of claim 6, wherein the default location includes one or more of:
   a social location based on social media posts exceeding a threshold, wherein the autonomous vehicle is directed to the social location;
   a parking location associated with the drop-off location, wherein the parking location is within a predetermined geographic range of the drop-off location;
   a vehicle operator location, wherein the vehicle operator location is determined based on user input; and
   a temporary location, wherein the temporary location is within a predetermined geographical range of the vehicle operator and the autonomous vehicle maintains a position for a duration not exceeding a predetermined time threshold.

11. A computer system for directing movements by an autonomous vehicle, the computer system comprising:
   one or more computer processors;
   one or more computer-readable storage media;
   program instructions stored on the computer-readable storage media for execution by at least one of the one or more processors, the program instructions comprising:
   instructions to detect a vehicle operator exiting a vehicle at a drop-off location;
   instructions to receive metadata identifying at least a location of the vehicle operator, social media posts associated with the vehicle operator, and timestamps associated with the social media posts;
   instructions to identify a pickup time and pickup location based on received metadata;
   instructions to generate a route to the pickup location based on at least a default location of the autonomous vehicle;
   instructions to direct a first autonomous vehicle to travel to the identified location such that the first autonomous vehicle arrives at the identified pickup time;
   instructions to determine updates to the pickup location and pickup time by dynamically monitoring received metadata;
   instructions to generate a modified route, the modified route includes one or more of an updated pickup location and updated pickup time, in response to instructions to determine updates to one or more of the pickup location and pickup time;
   instructions to redirect the first autonomous vehicle to the updated pickup location based on the modified route;
   instructions to generate a user profile associated with the vehicle operator;
   instructions to associate the received social media data with the vehicle operator's user profile;
   instructions to continuously monitor social media activity of the vehicle operator;
   instructions to determine proposed pickup locations based on the monitored social media posts, wherein the proposed pickup locations are geographical locations associated with a count of social media posts above a threshold; and
   instructions to communicate the proposed pickup locations to the vehicle operator device.

12. The computer system of claim 11, wherein metadata further comprises:
   timestamp data;
   location data based on a Global Positioning System (GPS);
   user profile history;
   call logs;
   pictorial data;
   video data; or
   audio data associated with the user profile.

13. The computer system of claim 11, further comprising:
   instructions to communicate the identified pickup time and identified pickup location to a second autonomous vehicle;
   instructions to generate a second route based on at least a second default location of the second autonomous vehicle;
   instructions to compare the generated route of the first autonomous vehicle to the generated route of the second autonomous vehicle to determine which generated route has a shortest travel time; and instructions to direct one of the first or second autonomous vehicles with the shortest travel time, to the identified location.

14. The computer system of claim 11, further comprising:
instructions to communicate for display on a vehicle operator device, one or more of:
the identified pickup time;
the identified pickup location; and
data associated with the generated route.

* * * * *